(12) United States Patent
Campos et al.

(10) Patent No.: US 7,849,032 B1
(45) Date of Patent: Dec. 7, 2010

(54) INTELLIGENT SAMPLING FOR NEURAL NETWORK DATA MINING MODELS

(75) Inventors: Marcos M. Campos, Cambridge, MA (US); Joseph Sigmund Yarmus, Groton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 458 days.

(21) Appl. No.: 10/153,607

(22) Filed: May 24, 2002

(51) Int. Cl.
*G06N 3/08* (2006.01)
(52) U.S. Cl. ............................. 706/25; 706/15; 706/16
(58) Field of Classification Search .................. 706/30, 706/10, 12–17, 39, 25
See application file for complete search history.

(56) References Cited

U.S. PATENT DOCUMENTS

| | | | | |
|---|---|---|---|---|
| 4,918,618 A * | 4/1990 | Tomlinson, Jr. | ............... | 706/25 |
| 5,228,113 A * | 7/1993 | Shelton | ........................ | 706/25 |
| 5,249,259 A * | 9/1993 | Harvey | ......................... | 706/13 |
| 5,359,699 A * | 10/1994 | Tong et al. | ................... | 706/20 |
| 5,566,273 A * | 10/1996 | Huang et al. | ................... | 706/25 |
| 6,119,112 A * | 9/2000 | Bush | ........................... | 706/25 |
| 6,269,351 B1 * | 7/2001 | Black | .......................... | 706/15 |
| 6,327,581 B1 * | 12/2001 | Platt | ............................ | 706/12 |
| 6,424,961 B1 * | 7/2002 | Ayala | .......................... | 706/25 |
| 6,640,215 B1 * | 10/2003 | Galperin et al. | ............... | 706/19 |
| 2003/0018598 A1 * | 1/2003 | Cawse et al. | .................. | 706/13 |

OTHER PUBLICATIONS

National Oceanic and Atmospheric Administration "A Review of Research Activity Related To WSR-88D Algorithms" May 30, 2001 (NOAA), pp. i,1 and 20-51.*

National Oceanic and Athmospheric Administration, "A Review of Research Activity Related to WSR-88D Algorithms", May 30, 2001, pp. i, 1 and 20-51.*

Gurney, Kevin; "An Introduction to Neural Networks" 1997, pp. 53-72.*

Gurney, Kevin; "An Introduction to Neural Networks" 1997, pp. 39-93.*

* cited by examiner

*Primary Examiner*—Donald Sparks
*Assistant Examiner*—Omar Fernandez Rivas
(74) *Attorney, Agent, or Firm*—Hanify & King, P.C.

(57) ABSTRACT

A method, system, and computer program product provides automated determination of the size of the sample that is to be used in training a neural network data mining model that is large enough to properly train the neural network data mining model, yet is no larger than is necessary. A method of performing training of a neural network data mining model comprises the steps of: a) providing a training dataset for training an untrained neural network data mining model, the first training dataset comprising a plurality of rows of data, b) selecting a row of data from the training dataset for performing training processing on the neural network data mining model, c) computing an estimate of a gradient or cost function of the neural network data mining model, d) determining whether the gradient or cost function of the neural network data mining model has converged, based on the computed estimate of the gradient or cost function of the neural network data mining model, e) repeating steps b)-d), if the gradient or cost function of the neural network data mining model has not converged, and f) updating weights of the neural network data mining model, if the gradient or cost function of the neural network data mining model has converged.

21 Claims, 7 Drawing Sheets

INTELLIGENT SAMPLING FOR NEURAL NETWORK DATA MINING MODELS

FIELD OF THE INVENTION

The present invention relates to automated determination of the size of the sample that is to be used in training a neural network data mining model.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated by based on one or more data analysis algorithms. Initially, the models are "untrained", but are "trained" by processing training data and generating information that defines the model. The generated information is then deployed for use in data mining, for example, by providing predictions of future behavior based on specific past behavior.

One type of modeling that is useful in building data mining models is neural network modeling. Generally, a neural network is a set of connected input/output units where each connection has a weight associated with it. During the learning phase, the network learns by adjusting the weights so as to be able to more accurately generate an output based on the input samples.

Traditionally, neural network models are trained using batch methods, in which large amounts of data are used to train the models. However, problems arise with these batch-training methods because the size of the data sample to be used for training must be specified. For large datasets, if all the rows of data in the dataset are used, the computation of necessary information, such as gradient and cost function information, becomes too computationally expensive. One solution to this problem is to sample the data in the dataset and only use the sample to train the model. However, this present a problem because the proper sample size must be chosen for best results. If the sample chosen is too large, the computation is still too expensive, while if the sample chosen is too small, the trained model is not adequately predictive of the dataset. Thus, the sample size must be chosen intelligently. Because each model or type of model requires different sample sizes, there is no fixed sample size that will work properly for all cases.

A need arises for an automated technique that determines the size of the sample that is to be used in training a neural network data mining model.

SUMMARY OF THE INVENTION

The present invention is a method, system, and computer program product that provides automated determination of the size of the sample that is to be used in training a neural network data mining model. The present invention provides a subsample of the training dataset that is large enough to properly train the neural network data mining model, yet is no larger than is necessary In one embodiment, a method of performing training of a neural network data mining model comprises the steps of: a) providing a training dataset for training an untrained neural network data mining model, the first training dataset comprising a plurality of rows of data, b) selecting a row of data from the training dataset for performing training processing on the neural network data mining model, c) computing an estimate of a gradient or cost function of the neural network data mining model, d) determining whether the gradient or cost function of the neural network data mining model has converged, based on the computed estimate of the gradient or cost function of the neural network data mining model, e) repeating steps b)-d), if the gradient or cost function of the neural network data mining model has not converged, and f) updating weights of the neural network data mining model, if the gradient or cost function of the neural network data mining model has converged.

In one aspect of the present invention, the selecting step comprises the step of randomly selecting the row of data from the training dataset for performing training processing on the neural network data mining model.

In one aspect of the present invention, the method further comprises the step of storing a number of rows of data that were selected.

In one aspect of the present invention, the method further comprises the step of performing additional training processing to the neural network data mining model using the training dataset, wherein the additional training processing is performed using a number of rows of data equal to the stored number of rows that were selected.

In one aspect of the present invention, the method further comprises the step of performing additional training processing to the neural network data mining model by repeating steps b)-f) until a decrease in an error of the neural network data mining model is less than a predefined threshold.

In one embodiment, a method of performing training of a neural network data mining model comprises the steps of: a) providing a training dataset for training an untrained neural network data mining model, the first training dataset comprising a plurality of rows of data, b) selecting, in each of a plurality of threads, a row of data from the training dataset for performing training processing on the neural network data mining model, c) computing, in each of the plurality of threads, an estimate of a gradient or cost function of the neural network data mining model, d) consolidating the computed estimate of the gradient or cost function of the neural network data mining model from each thread to form a consolidated gradient or cost function, e) determining whether the consolidated gradient or cost function of the neural network data mining model has converged, based on the consolidated computed estimate of the gradient or cost function of the neural network data mining model, e) repeating steps b)-d), if the consolidated gradient or cost function of the neural network data mining model has not converged, and f) updating weights of the neural network data mining model, if the consolidated gradient or cost function of the neural network data mining model has converged.

In one aspect of the present invention, the selecting step comprises the step of randomly selecting, in each of the plurality of threads, the row of data from the training dataset for performing training processing on the neural network data mining model.

In one aspect of the present invention, the method further comprises the steps of consolidating a number of rows of data that were selected by each thread to from a consolidated gradient or cost function, and storing the consolidated number of rows.

In one aspect of the present invention, the method further comprises the steps of performing additional training processing to the neural network data mining model using the training dataset, wherein the additional training processing is performed using a number of rows of data equal to the stored consolidated number of rows.

In one aspect of the present invention, each thread processes an equal portion of the number of rows of data processed.

In one aspect of the present invention, the method further comprises the steps of performing additional training processing to the neural network data mining model by repeating steps b)-f) until a decrease in an error of the neural network data mining model is less than a predefined threshold.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
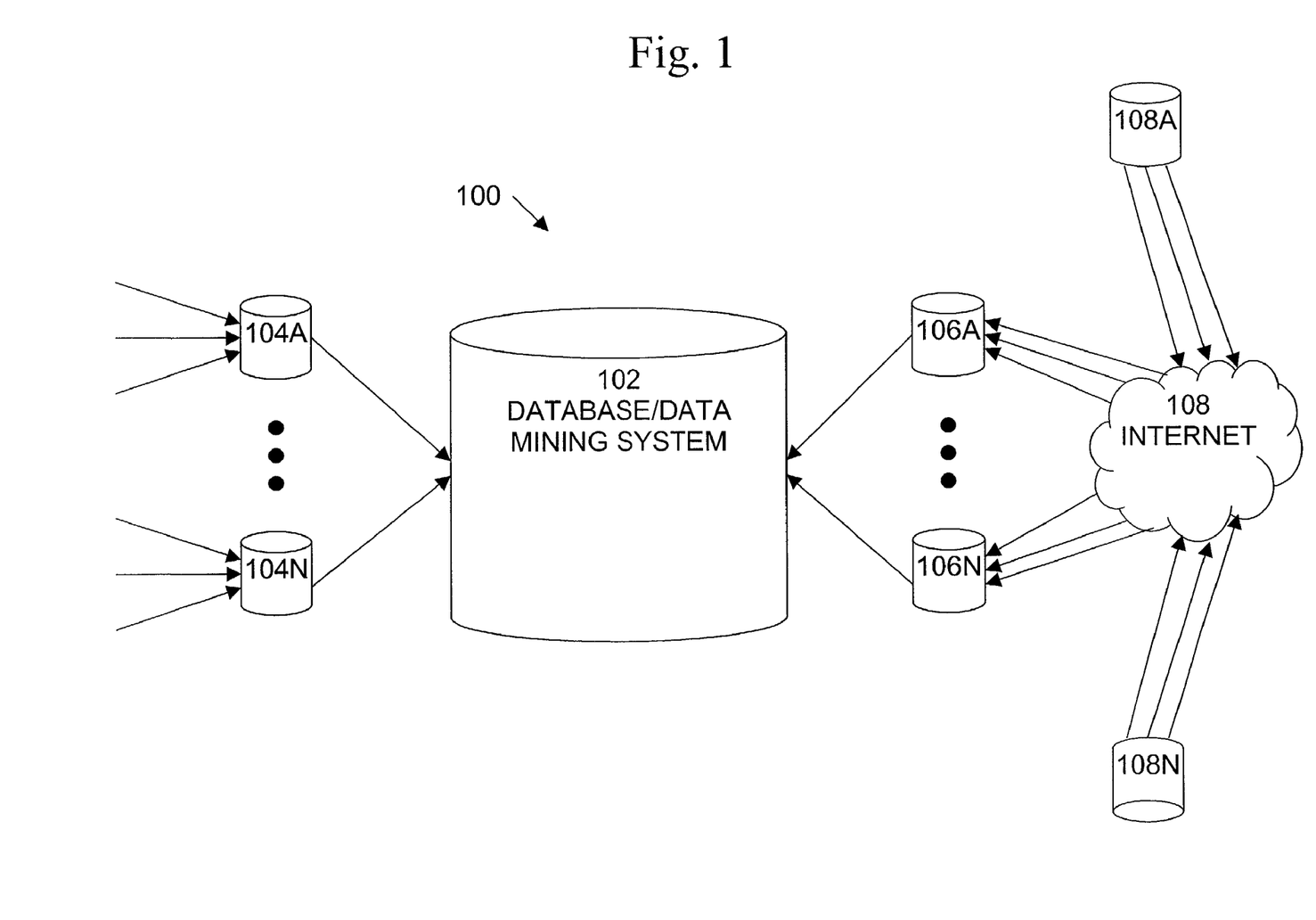
FIG. 1 is an exemplary block diagram of a data mining system, in which the present invention may be implemented.

An exemplary data mining system 100, in which the present invention may be implemented, is shown in FIG. 1. System 100 includes a database/data mining system 102 that is connected to a variety of sources of data. For example, system 102 may be connected to a plurality of internal or proprietary data sources, such as systems 104A-104N. Systems 104A-104N may be any type of data source, warehouse, or repository, including those that are not publicly accessible. Examples of such systems include inventory control systems, accounting systems, scheduling systems, etc. System 102 may also be connected to a plurality of proprietary data sources that are accessible in some way over the Internet 108. Such systems include systems 106A-106N, shown in FIG. 1. Systems 106A-106N may be publicly accessible over the Internet 108, they may be privately accessible using a secure connection technology, or they may be both publicly and privately accessible. System 102 may also be connected to other systems over the Internet 108. For example, system 110 may be privately accessible to system 102 over the Internet 108 using a secure connection, while system 112 may be publicly accessible over the Internet 108.

The common theme to the systems connected to system 102 is that the connected systems all are potential sources of data for system 102. The data involved may be of any type, from any original source, and in any format. System 102 has the capability to utilize and all such data that is available to it.

Figure 2:
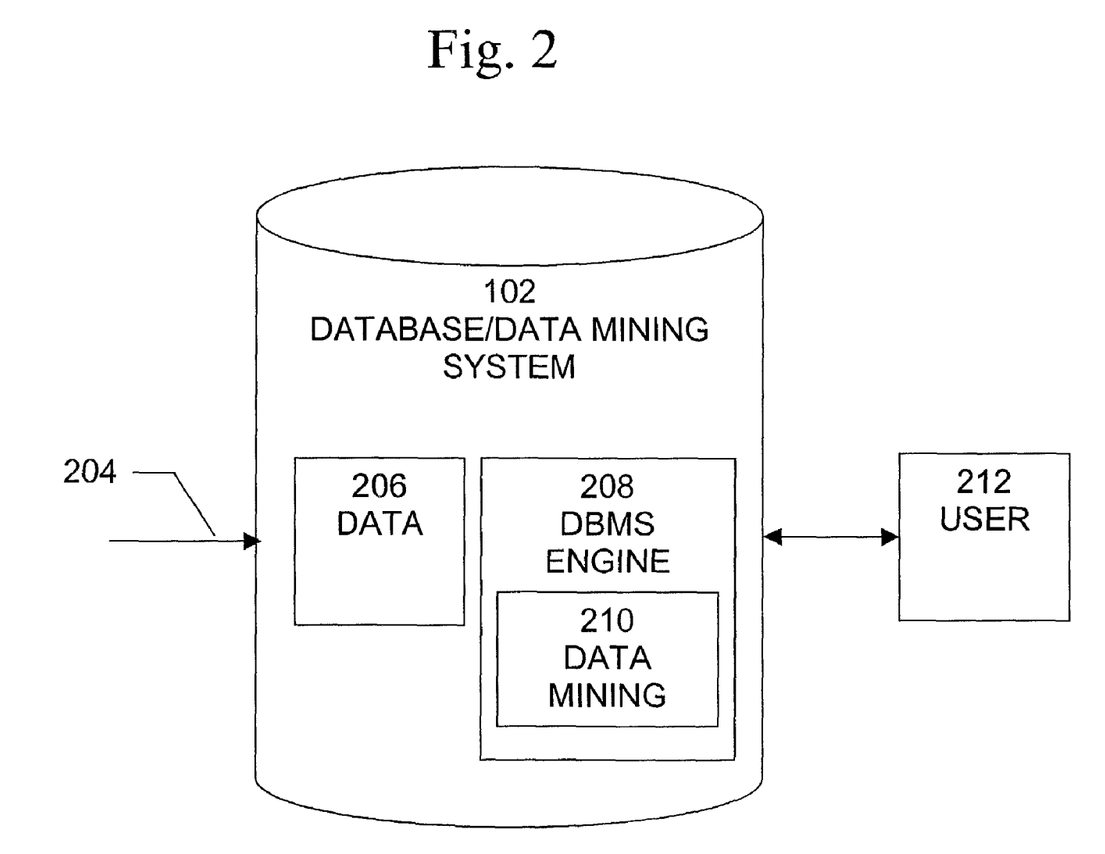
FIG. 2 is an exemplary block diagram of a database/data mining system shown in FIG. 1.

An exemplary embodiment of database/data mining system 102 is shown in FIG. 2. System 102 is a database management system that includes data mining functionality. Database management system 202 is connected to data sources 204, such as the proprietary and public data sources shown in FIG. 1. Database management system includes two main components, data 206, and database management system (DBMS) engine 208. Data 206 includes data, typically arranged as a plurality of data tables, such as relational data tables, as well as indexes and other structures that facilitate access to the data. DBMS engine 208 typically includes software that receives and processes queries of the database, obtains data satisfying the queries, and generates and transmits responses to the queries. DBMS engine 208 also includes data mining block 210, which provides DBMS engine 208 with the capability to obtain data and perform data mining processing on that data, so as to respond to requests for data mining processed data from one or more users, such as user 212.

Figure 3:
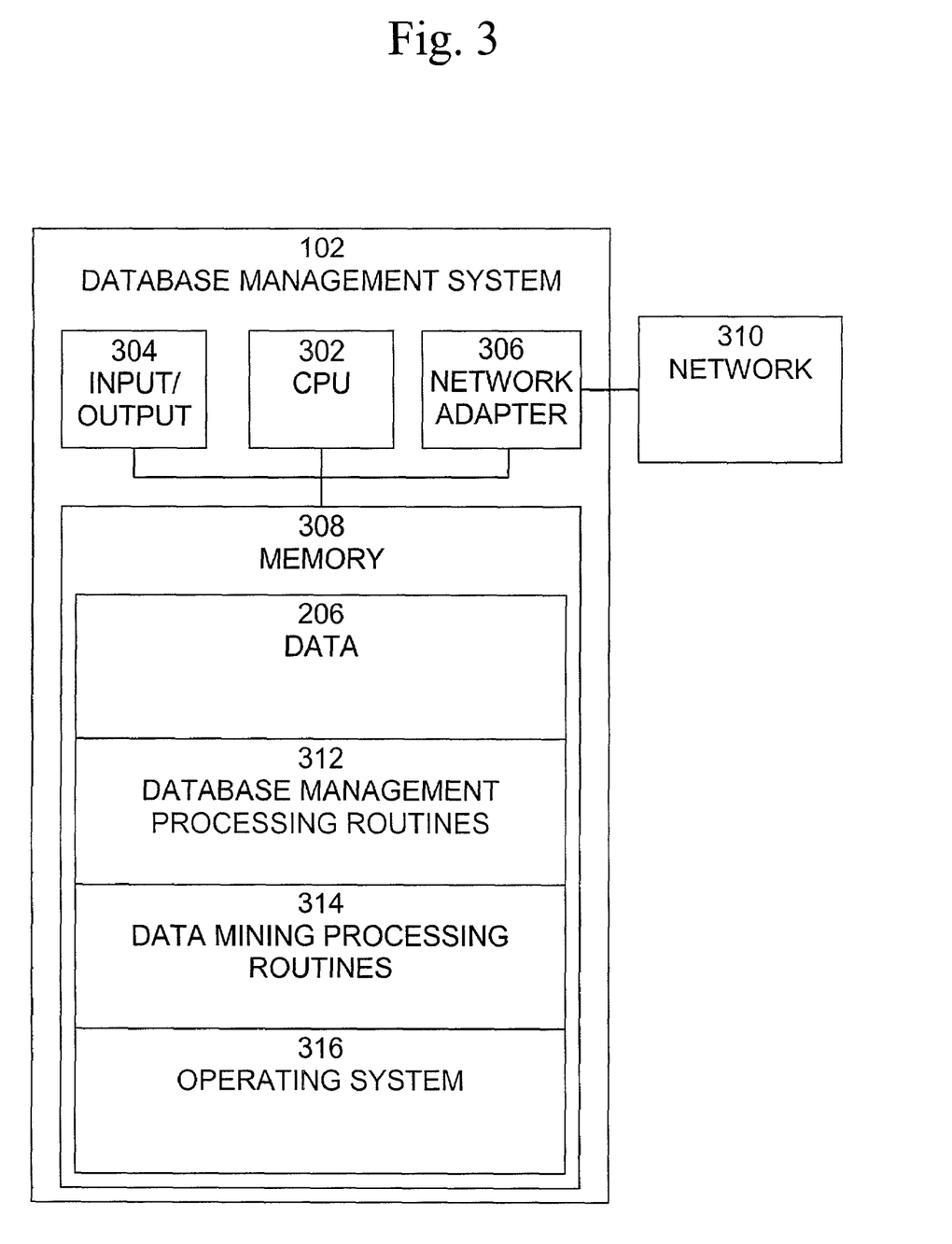
FIG. 3 is an exemplary block diagram of a database/data mining system shown in FIG. 1.

An exemplary block diagram of a database/data mining system 102, shown in FIG. 1, is shown in FIG. 3. Database/data mining system 102 is typically a programmed general-purpose computer system, such as a personal computer, workstation, server system, and minicomputer or mainframe computer. Database/data mining system 102 includes processor (CPU) 302, input/output circuitry 304, network adapter 306, and memory 308. CPU 302 executes program instructions in order to carry out the functions of the present invention. Typically, CPU 302 is a microprocessor, such as an INTEL PENTIUM® processor, but may also be a minicomputer or mainframe computer processor. Input/output circuitry 304 provides the capability to input data to, or output data from, database/data mining system 102. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces database/data mining system 102 with network 310. Network 310 may be any standard local area network (LAN) or wide area network (WAN), such as Ethernet, Token Ring, the Internet, or a private or proprietary LAN/WAN.

Memory 308 stores program instructions that are executed by, and data that are used and processed by, CPU 302 to perform the functions of the database/data mining system 102. Memory 308 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 308 includes data 206, database management processing routines 312, data mining processing routines 314, and operating system 316. Data 206 includes data, typically arranged as a plurality of data tables, such as relational database tables, as well as indexes and other structures that facilitate access to the data. Database management processing routines 312 are software routines that provide database management functionality, such as database query processing. Data mining processing routines 314 are software routines that implement the data mining processing performed by the present invention. In particular, data mining processing routines 314 include software routines that perform the center based cluster analysis of the present invention. Preferably, this data mining processing is integrated with database management processing. For example, data mining processing may be initiated by receipt of a database query, either in standard SQL or in the form of extended SQL statements, or data mining processing may be initiated from a programming language, such as JAVA. Operating system 320 provides overall system functionality.

Although the example shown in FIG. 3 illustrates a single processor system, the present invention contemplates implementation on a system or systems that provide multi-processor, multi-tasking, multi-process, and/or multi-thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

In most operating systems, there is a one-to-one relationship between the task and the program, but some operating systems allow a program to be divided into multiple tasks. Such systems are called multithreading operating systems. A thread—sometimes called an execution context or a lightweight process—is a single sequential flow of control within a program. A thread itself is not a program; it cannot run on its own. Rather, it runs within a program. A thread is similar to a real process in that a thread and a running program are both a single sequential flow of control. However, a thread is considered lightweight because it runs within the context of a full-blown program and takes advantage of the resources allocated for that program and the program's environment. As a sequential flow of control, a thread must carve out some of its own resources within a running program. (It must have its own execution stack and program counter for example.) The code running within the thread works only within that context. A thread may also be referred as a lightweight process or as an execution context.

A thread is a semi-process, which has its own stack, and executes a given piece of code. Unlike a real process, the thread normally shares its memory with other threads (where as for processes we usually have a different memory area for each one of them). A Thread Group is a set of threads all executing inside the same process. They all share the same memory, and thus can access the same global variables, same heap memory, same set of file descriptors, etc. All these threads execute in parallel (i.e. using time slices, or if the system has several processors, then really in parallel).

The advantage of using a thread group instead of a normal serial program is that several operations may be carried out in parallel, and thus events can be handled immediately as they arrive (for example, if we have one thread handling a user interface, and another thread handling database queries, we can execute a heavy query requested by the user, and still respond to user input while the query is executed).

The advantage of using a thread group over using a process group is that context switching between threads is much faster then context switching between processes (context switching means that the system switches from running one thread or process, to running another thread or process). Also, communications between two threads is usually faster and easier to implement then communications between two processes. On the other hand, because threads in a group all use the same memory space, if one of them corrupts the contents of its memory, other threads might suffer as well. With processes, the operating system normally protects processes from one another, and thus if one corrupts its own memory space, other processes won't suffer. Another advantage of using processes is that they can run on different machines, while all the threads have to run on the same machine (at least normally).

Figure 4:
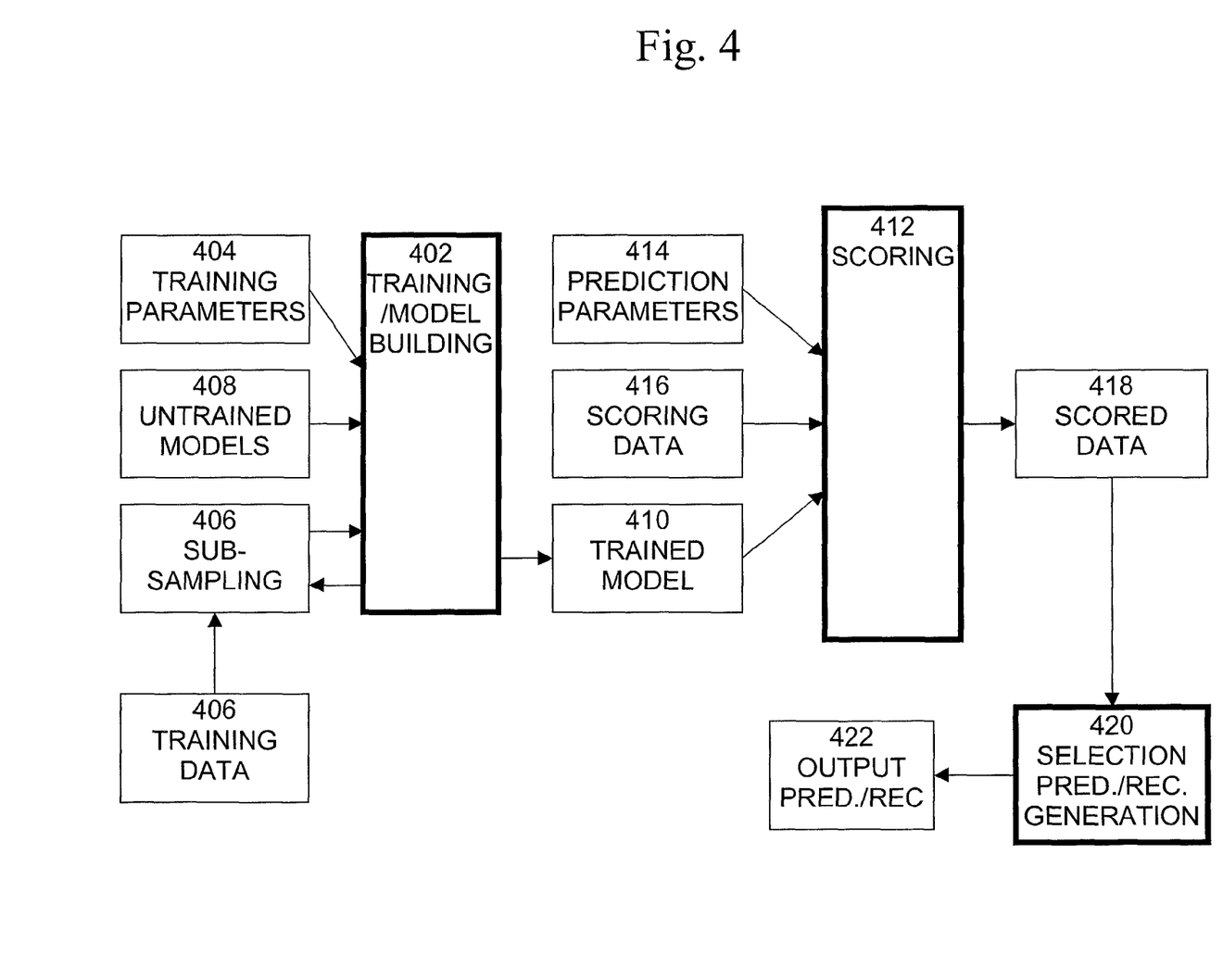
FIG. 4 is an exemplary data flow diagram of a data mining process, which may be implemented in the system shown in FIG. 1.

An exemplary data flow diagram of a data mining process, including building and scoring of models and generation of predictions/recommendations, is shown in FIG. 4. The training/model building step 402 involves generating the models that are used to perform data mining recommendation and prediction. The inputs to training/model building step 402 include training parameters 404, training data 406, and untrained models 408. Untrained models 408 include algorithms that process the training data 406 in order to actually build the models. In particular, untrained models 408 includes algorithms that are used to build data mining models that are based on neural networks. Training parameters 404 are parameters that are input to the data-mining model building algorithms to control how the algorithms build the models. Training data 406 is data that is input to the algorithms and which is used to actually build the models.

Training/model building step 402 invokes the data mining model building algorithms included in untrained models 408, initializes the algorithms using the training parameters 404, processes training data 406 using the algorithms to build the model, and generates trained model 410. Trained model 410 includes information, such as functions, that implements the conditions and decisions that make up an operational model. In particular, neural network models implement a mapping between the input space and the output space. This mapping may be implemented, for example, by a combination of basis functions, which define the neural network topology, and transfer functions, which define the transfer of information between nodes in the network. Trained model 410 may also be evaluated and adjusted in order to improve the quality, i.e. prediction accuracy, of the model. Trained model 410 is then encoded in an appropriate format and deployed for use in making predictions or recommendations.

Scoring step 412 involves using the deployed trained model 410 to make predictions or recommendations based on new data that is received. Trained model 410, prediction parameters 414, and prediction data 416 are input to scoring step 412. Trained models 410 include information defining the model that was generated by model building step 402. Prediction parameters 414 are parameters that are input to the scoring step 418 to control the scoring of scoring data 416 against trained model 410 and are input to the selection and prediction/recommendation step 420 to control the selection of the scored data and the generation of predictions and recommendations Scoring data 416 is processed according trained model 410, as controlled by prediction parameters 414, to generate one or more scores for each row of data in scoring data 416. The scores for each row of data indicate how closely the row of data matches attributes of the model, how much confidence may be placed in the prediction, how likely each output prediction/recommendation to be true, and other statistical indicators. Scored data 418 is output from scoring step 412 and includes predictions or recommendations, along with corresponding probabilities for the scored data.

Scored model 418 is input to selection and prediction/recommendation generation step, which evaluates the probabilities associated with the predictions/recommendations and selects at least a portion of the predictions/recommendations. The selected predictions/recommendations are those having probabilities meeting the selection criteria. The selection criteria may be defined by desired results data and/or by predefined or default criteria included in selection/generation step 420. In addition, the selection criteria may include a limit on the number of predictions/recommendations that are to be selected, or may indicate that the predictions/recommendations are to be sorted based on their associated probabilities. The selected predictions/recommendations are output 422 from step 420 for use in data mining.

Figure 5:
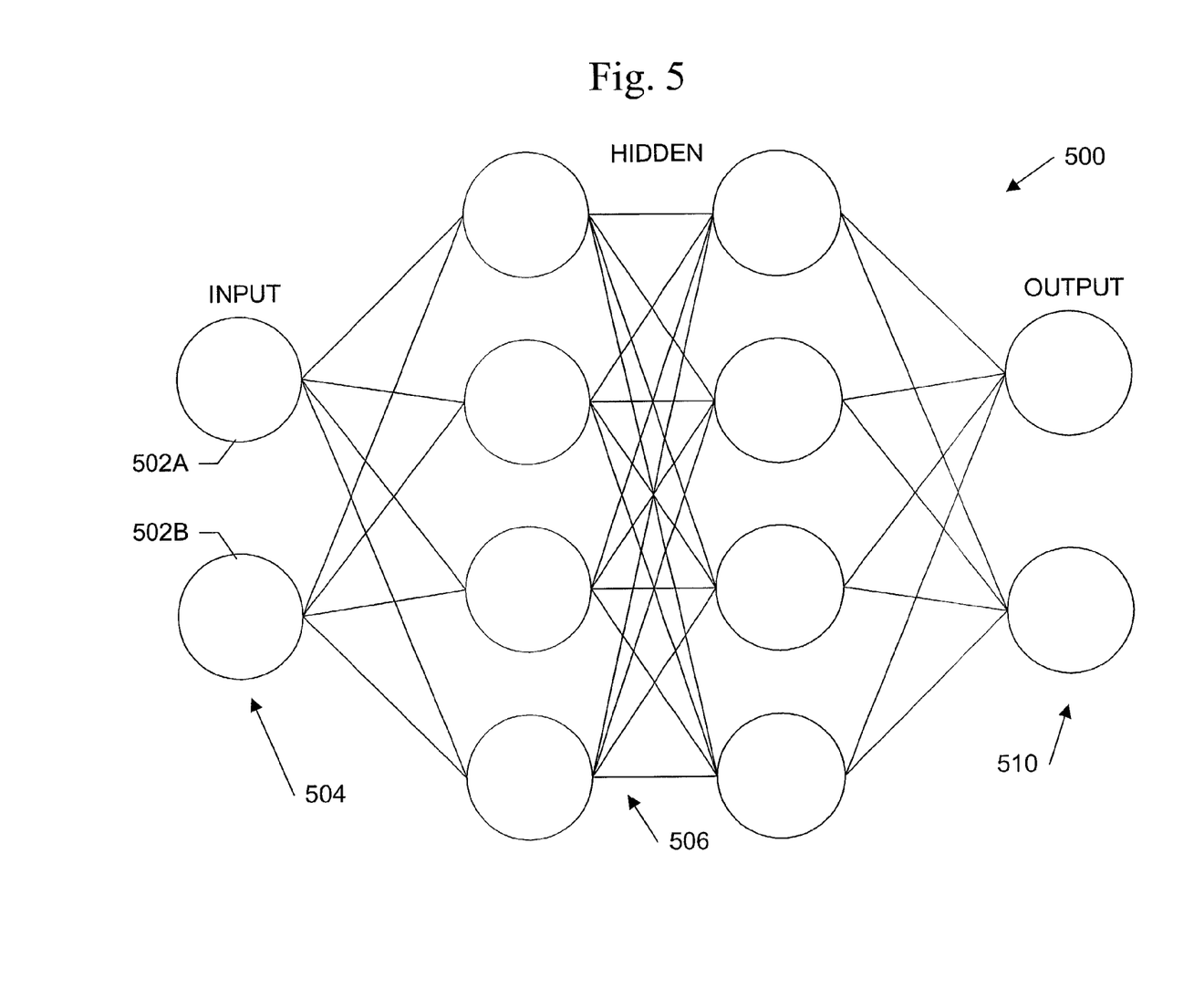
FIG. 5 is an exemplary block diagram of an artificial neural network of the type that may be used in a neural network data mining model.

An example of an artificial neural network of the type that may be used in a neural network data mining model is shown in FIG. 5. Neural networks, such as network 500, are typically organized in layers. Layers are made up of a number of interconnected nodes, such as nodes 502A and 502B, each of which contains an activation function. Patterns are presented to the network via the input layer 504, which communicates to one or more hidden layers 506 where the actual processing is done via a system of weighted connections 508. The hidden layers then link to an output layer 510 where the answer is output.

Most artificial neural networks contain some form of learning rule, which modifies the weights of the connections according to the input patterns that are presented. In a sense, artificial neural networks learn by example as do their biological counterparts.

There are many different kinds of learning rules used by neural networks. A typical well-known learning rule is the delta rule. The delta rule is often utilized by the most common class of artificial neural networks, which are called backpropagational neural networks (BPNNs). Backpropagation refers to the backwards propagation of error in the neural network.

Figure 6:
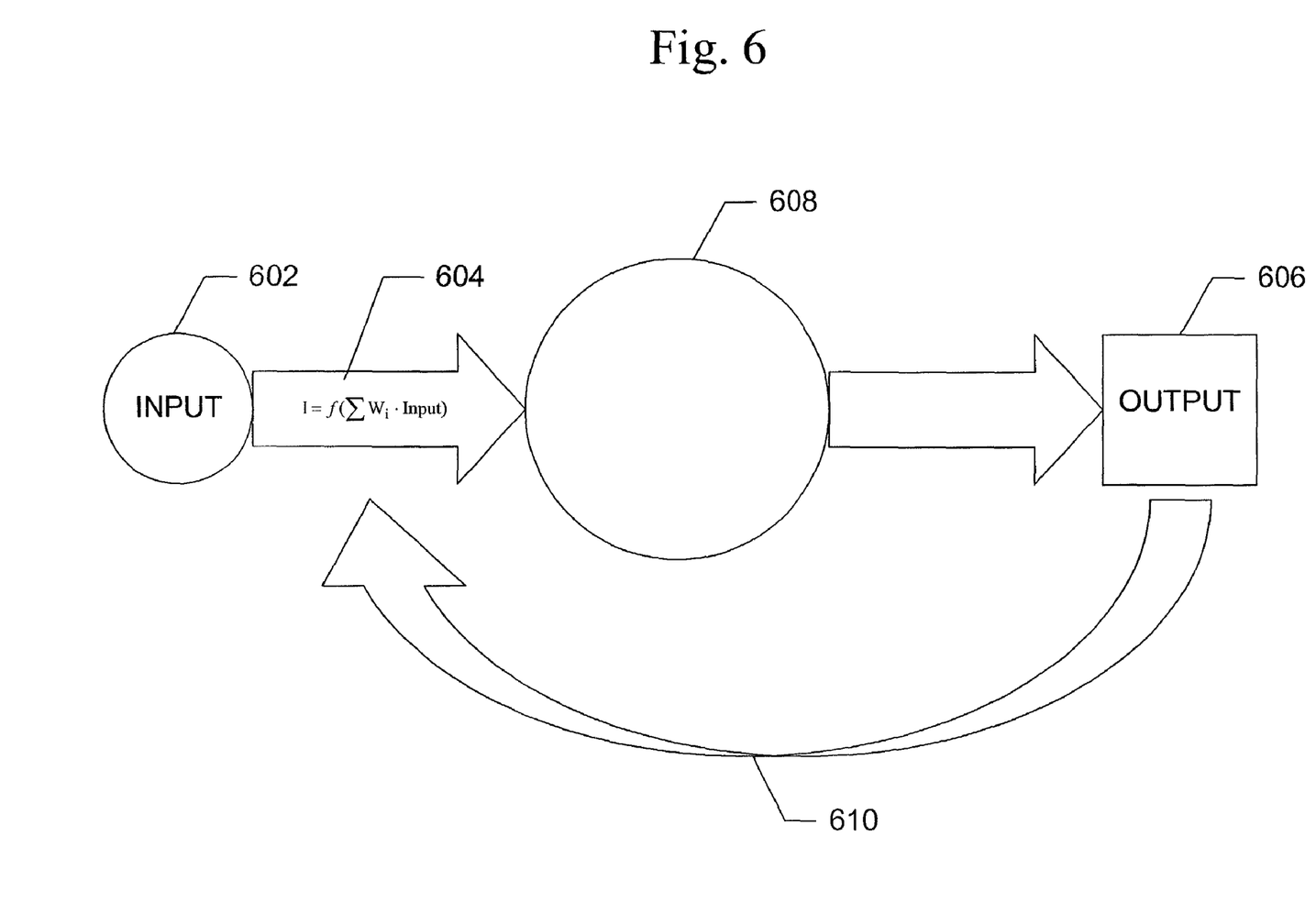
FIG. 6 is an exemplary flow diagram of backpropagation learning process in the artificial neural network shown in FIG. 5.

With the delta rule, as with other types of backpropagation, learning is a supervised process that occurs with each cycle or epoch. This backpropagation learning process is shown in FIG. 6. Each time the network is presented with a new input pattern 602 (a new cycle or epoch), the input is filtered through a weight function 604, such as the function: I=f ($\Sigma W_i \cdot$Input), where $W_i$ are the weights. The output 606 is generated by a combination of various nodes in the hidden layers 608. Within each hidden layer node is an activation function that polarizes network activity and helps stabilize it. The weights are adjusted through a forward activation flow of outputs, and the backwards error propagation of weight adjustments using a backpropagation function, such as $$W_{new} = W_{old} - \beta \nabla_W E.$$

More simply, when a neural network is initially presented with a pattern, it makes a random guess as to what it might be. It then sees how far its answer was from the actual one and makes an appropriate adjustment to its connection weights.

Backpropagation performs a gradient descent within the solution's vector space towards a global minimum along the steepest vector of the error surface. The global minimum is that theoretical solution with the lowest possible error. The error surface itself is a hyperparaboloid but is seldom smooth. Indeed, in most problems, the solution space is quite irregular with numerous 'pits' and 'hills', which may cause the network to settle down in a local minimum, which is not the best overall solution. When the error has reached the global minimum, or at least a local minimum of acceptable quality, the error function may be said to have converged. Alternatively to using just the error function, a cost function that takes into account the cost of the various nodal transitions, as well as the error, may be used.

Figure 7:
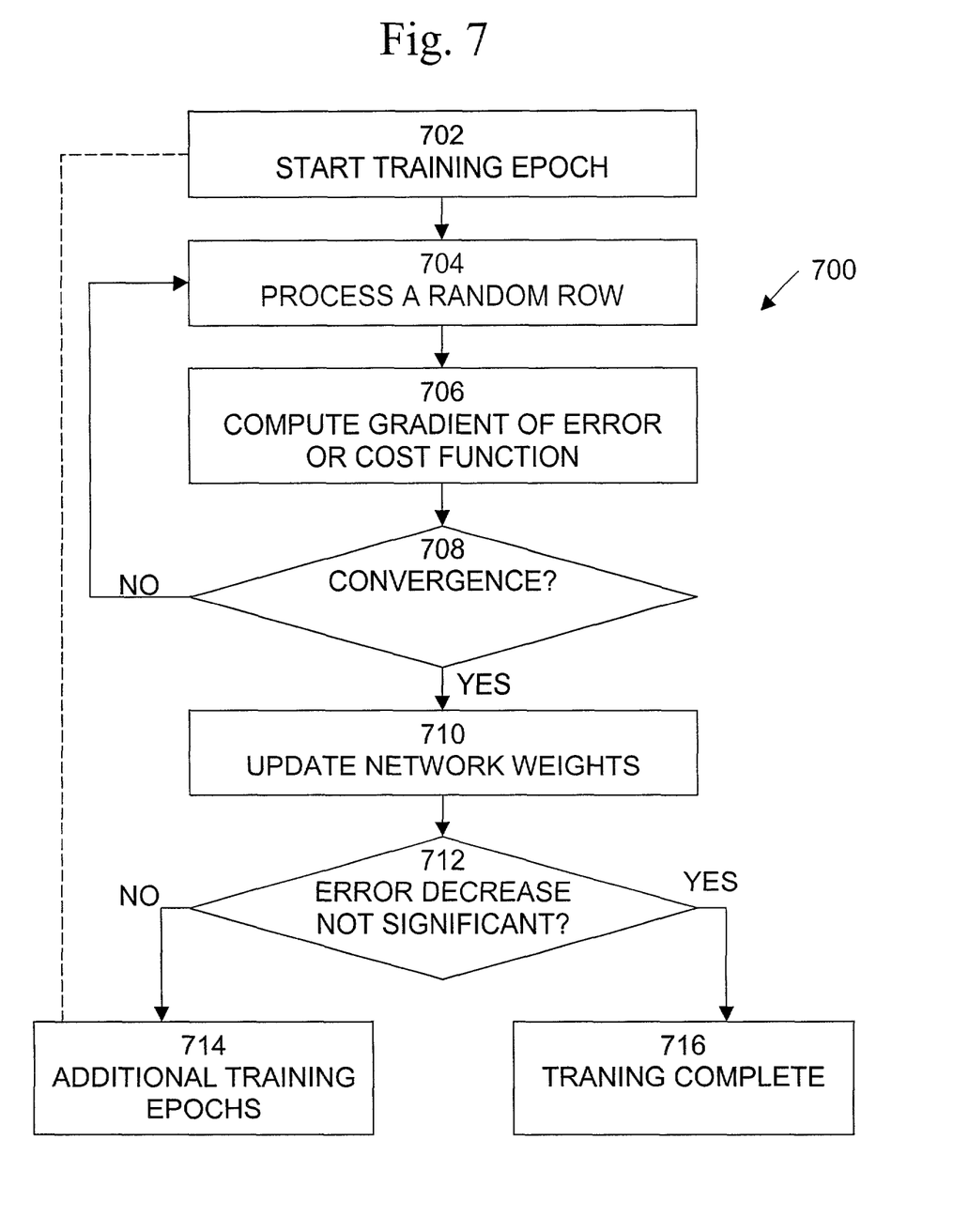
FIG. 7 is an exemplary flow diagram of a subsampling process for use in a single threaded embodiment of the present invention.

An exemplary flow diagram of a subsampling process 700, for use in a single threaded embodiment of the present invention, is shown in FIG. 7. Process 700 begins with step 702, in which a training epoch is started. In step 704, a randomly selected row of data in the training dataset is processed for training of a neural network model. In step 706, an estimate of the gradient of an error or cost function of the neural network model being trained is computed. For example, error or cost functions, such as those described above, may be used. In step 708, it is determined whether the gradient descent of the error or cost functions has converged. The determination of whether the gradient descent of the error or cost functions has converged is performed at regular intervals of N rows, where $N \geq 1$. Where N=1, the determination is performed for each row. Where N>1, the determination is performed less frequently, which improves processing performance of the system. If the gradient descent of the error or cost functions has not converged, then the process loops back to step 704, and an additional row of data in the training dataset is processed. If the gradient descent of the error or cost functions has converged, then the process continues with step 710, in which the weights of the neural network model are updated. In addition, the number of rows that were processed in order to achieve convergence is made available. The number of rows that were processed are a subset of the total number of rows in the training dataset, yet convergence of the neural network data mining model has been achieved. Thus, process 700 provides a subsample of the training dataset that is large enough to properly train the neural network data mining model, yet is no larger than is necessary.

In step 712, it is determined, for each training epoch, whether the error of the neural network data mining model has decreased significantly from the previous training epoch. A significant decrease is typically defined as being greater than a predefined threshold; thus, a decrease that is not significant is a decrease that is less than the predefined threshold. If, in step 714, it is determined that the decrease in the error of the neural network data mining model is significant, then the process continues with step 714, in which at least one additional training epoch is performed. If, in step 712, it is determined that the decrease in the error of the neural network data mining model is not significant, then the process continues with step 716, in which the training of the neural network data mining model is complete.

In step 714, additional training epochs are performed. Each additional training epoch uses the same dataset, but, since in step 704, the rows of data actually processed are randomly selected, each epoch uses a different selection of rows of data. In one embodiment, the number of rows of data used in each successive training epoch is the number of rows that were processed in order to achieve convergence in the first training epoch. Processing of this number of rows will provide to each later epoch a subsample of the training dataset that is large enough to properly train the neural network data mining model, yet is no larger than is necessary. Alternatively, steps 702-712 may be repeated by later training epochs, in order to more precisely tailor the number of rows of data processed to the particular rows of data that are selected in the epoch. Repeating steps 702-712 will ensure that the neural network data mining model will properly converge, even if the data selected in later training epochs differs significantly from the data selected in the initial training epoch.

Process 700 may be implemented in a single-threaded computing environment, or may also be advantageously implemented in a multi-threaded environment. In a multi-threaded environment, process 700 begins with step 702, in which a training epoch is started. In step 704, each thread processes a randomly selected row of data in the training dataset for training of a neural network model. In step 706, each thread computes an estimate of the gradient of an error or cost function of the neural network model being trained. For example, error or cost functions, such as those described above, may be used. In step 708, the computed gradients from each thread are consolidated to form a single gradient, and it is determined whether the consolidated gradient descent of the error or cost functions has converged. The determination of whether the gradient descent of the error or cost functions has converged is performed at regular intervals of N rows, where $N \geq 1$. Where $N=1$, the determination is performed for each row. Where $N>1$, the determination is performed less frequently, which improves processing performance of the system. If the gradient descent of the error or cost functions has not converged, then the process loops back to step 704, and each thread processes an additional row of data in the training dataset. If the gradient descent of the error or cost functions has converged, then the process continues with step 710, in which the weights of the neural network model are updated. In addition, the number of rows that were processed by each thread in order to achieve convergence is consolidated and made available. The consolidated number of rows that were processed are a subset of the total number of rows in the training dataset, yet convergence of the neural network data mining model has been achieved. Thus, process 700 provides a subsample of the training dataset that is large enough to properly train the neural network data mining model, yet is no larger than is necessary.

In step 712, it is determined, for each training epoch, whether the error of the neural network data mining model has decreased significantly from the previous training epoch. A significant decrease is typically defined as being greater than a predefined threshold; thus, a decrease that is not significant is a decrease that is less than the predefined threshold. If, in step 714, it is determined that the decrease in the error of the neural network data mining model is significant, then the process continues with step 714, in which at least one additional training epoch is performed. If, in step 712, it is determined that the decrease in the error of the neural network data mining model is not significant, then the process continues with step 716, in which the training of the neural network data mining model is complete.

In step 714, additional training epochs are performed. Each additional training epoch uses the same dataset, but, since in step 704, the rows of data actually processed are randomly selected, each epoch uses a different selection of rows of data. In one embodiment, the number of rows of data used in each successive training epoch is the consolidated number of rows that were processed by all threads in order to achieve convergence in the first training epoch. Processing of this number of rows will provide to each later epoch a subsample of the training dataset that is large enough to properly train the neural network data mining model, yet is no larger than is necessary. The consolidated number of rows is used as the total number of rows, and an equal portion of that total number of rows may be processed by each thread. Alternatively, steps 702-712 may be repeated by later training epochs, in order to more precisely tailor the number of rows of data processed to the particular rows of data that are selected in the epoch. Repeating steps 702-712 will ensure that the neural network data mining model will properly converge, even if the data selected in later training epochs differs significantly from the data selected in the initial training epoch.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer implemented method of performing training of a neural network data mining model comprising:
   a) providing a training dataset to a neural network for training an untrained neural network data mining model, the training dataset comprising a plurality of rows of data, wherein the neural network data mining model is trained by:
   b) selecting a row of data from the training dataset for performing training processing on the neural network data mining model;
   c) computing an estimate of a gradient or cost function of the neural network data mining model based on the selected row of data, wherein the cost function accounts for the cost of various nodal transitions;
   d) determining whether the gradient or cost function of the neural network data mining model has converged using the selected row of data, based on the computed estimate of the gradient or cost function of the neural network data mining model, wherein the computing an estimate is performed before the determining;
   e) repeating steps b)-d) using another row of data, if the gradient or cost function of the neural network data mining model has not converged;
   f) updating weights of the neural network data mining model if the gradient or cost function of the neural network data mining model has converged and providing the number of rows of data that were used for performing training processing on the neural network data mining model, wherein the number of rows that were used is a subset of the total number of rows in the training dataset, and wherein the neural network data mining model uses less than the entire training dataset to train the neural network data mining model; and g) performing additional training processing to the neural network data mining model using the training dataset, wherein the additional training processing is performed using a number of rows of data equal to the provided number of rows of data.

2. The method of claim 1, wherein the selecting step comprises the step of:

randomly selecting the row of data from the training dataset for performing training processing on the neural network data mining model.

3. The method of claim 1, further comprising the step of:

performing additional training processing to the neural network data mining model by repeating steps b)-f) until a decrease in an error of the neural network data mining model is less than a predefined threshold.

4. A computer implemented method of performing training of a neural network data mining model comprising:

a) providing a training dataset to a neural network for training an untrained neural network data mining model, the training dataset comprising a plurality of rows of data, wherein the neural network data mining model is trained by:

b) selecting, in each of a plurality of threads, a row of data from the training dataset for performing training processing on the neural network data mining model;

c) computing, in each of the plurality of threads, an estimate of a gradient or cost function of the neural network data mining model based on the selected row of data, wherein the cost function accounts for the cost of various nodal transitions;

d) consolidating the computed estimate of the gradient or cost function of the neural network data mining model from each thread based on the selected row of data to form a consolidated gradient or cost function;

e) determining whether the consolidated gradient or cost function of the neural network data mining model has converged using the selected row of data, based on the consolidated computed estimate of the gradient or cost function of the neural network data mining model, wherein the computing an estimate is performed before the determining;

f) repeating steps b)-d) using another row of data, if the consolidated gradient or cost function of the neural network data mining model has not converged; and g) updating weights of the neural network data mining model if the consolidated gradient or cost function of the neural network data mining model has converged and providing the number of rows of data that were used for performing training processing on the neural network data mining model for each thread in the plurality of threads and consolidating the number of rows for each thread, wherein the consolidated number of rows is a subset of the total number of rows in the training dataset, and wherein the neural network data mining model uses less than the entire training dataset to train the neural network data mining model; and h) performing additional training processing to the neural network data mining model using the training dataset, wherein the additional training processing is performed using a number of rows of data equal to the consolidated number of rows.

5. The method of claim 4, wherein the selecting step comprises the step of:

randomly selecting, in each of the plurality of threads, the row of data from the training dataset for performing training processing on the neural network data mining model.

6. The method of claim 4, wherein each thread processes an equal portion of the number of rows of data processed.

7. The method of claim 4, further comprising the step of:

performing additional training processing to the neural network data mining model by repeating steps b)-f) until a decrease in an error of the neural network data mining model is less than a predefined threshold.

8. A computer implemented system for performing training of a neural network data mining model, comprising:

a processor operable to execute computer program instructions; and a memory operable to store computer program instructions executable by the processor, the computer program instructions for performing the steps of:

a) providing a training dataset to a neural network for training an untrained neural network data mining model, the training dataset comprising a plurality of rows of data, wherein the neural network data mining model is trained by:

b) selecting a row of data from the training dataset for performing training processing on the neural network data mining model;

c) computing an estimate of a gradient or cost function of the neural network data mining model based on the selected row of data, wherein the cost function accounts for the cost of various nodal transitions;

d) determining whether the gradient or cost function of the neural network data mining model has converged using the selected row of data, based on the computed estimate of the gradient or cost function of the neural network data mining model, wherein the computing an estimate is performed before the determining;

e) repeating steps b)-d) using another row of data, if the gradient or cost function of the neural network data mining model has not converged; and f) updating weights of the neural network data mining model if the gradient or cost function of the neural network data mining model has converged and providing the number of rows of data that were used for performing training processing on the neural network data mining model, wherein the number of rows that were used is a subset of the total number of rows in the training dataset and wherein the neural network data mining model uses less than the entire training dataset to train the neural network data mining model; and g) performing additional training processing to the neural network data mining model using the training dataset, wherein the additional training processing is performed using a number of rows of data equal to the provided number of rows of data.

9. The system of claim 8, wherein the selecting step comprises the step of:

randomly selecting the row of data from the training dataset for performing training processing on the neural network data mining model.

10. The method of claim 8, further comprising the step of:

performing additional training processing to the neural network data mining model by repeating steps b)-f) until a decrease in an error of the neural network data mining model is less than a predefined threshold.

11. A computer implemented system for performing training of a neural network data mining model, comprising:

a processor operable to execute computer program instructions; and a memory operable to store computer program instructions executable by the processor in a multi-threaded environment, the computer program instructions for performing the steps of:
a) providing a training dataset to a neural network for training an untrained neural network data mining model, the training dataset comprising a plurality of rows of data, wherein the neural network data mining model is trained by:
b) selecting, in each of a plurality of threads, a row of data from the training dataset for performing training processing on the neural network data mining model;
c) computing, in each of the plurality of threads, an estimate of a gradient or cost function of the neural network data mining model based on the selected row of data, wherein the cost function accounts for the cost of various nodal transitions;
d) consolidating the computed estimate of the gradient or cost function of the neural network data mining model from each thread based on the selected row of data to form a consolidated gradient or cost function;
e) determining whether the consolidated gradient or cost function of the neural network data mining model has converged using the selected row of data, based on the consolidated computed estimate of the gradient or cost function of the neural network data mining mode, wherein the computing an estimate is performed before the determining;
f) repeating steps b)-e) using another row of data, if the consolidated gradient or cost function of the neural network data mining model has not converged; and
g) updating weights of the neural network data mining model if the consolidated gradient or cost function of the neural network data mining model has converged and providing the number of rows of data that were used for performing training processing on the neural network data mining model for each thread in the plurality of threads and consolidating the number of rows for each thread, wherein the consolidated number of rows is a subset of the total number of rows in the training dataset, and wherein the neural network data mining model uses less than the entire training dataset to train the neural network data mining model; and
h) performing additional training processing to the neural network data mining model using the training dataset, wherein the additional training processing is performed using a number of rows of data equal to the consolidated number of rows.

12. The system of claim 11, wherein the selecting step comprises the step of:
randomly selecting, in each of the plurality of threads, the row of data from the training dataset for performing training processing on the neural network data mining model.

13. The method of claim 11, wherein each thread processes an equal portion of the number of rows of data processed.

14. The system of claim 11, further comprising the step of:
performing additional training processing to the neural network data mining model by repeating steps b)-f) until a decrease in an error of the neural network data mining model is less than a predefined threshold.

15. A computer program product for performing training of a neural network data mining model in an electronic data processing computer program product, comprising:
a computer readable medium;
computer program instructions, recorded on the computer readable medium, executable by a processor, for performing the steps of:
a) providing a training dataset to a neural network for training an untrained neural network data mining model, the training dataset comprising a plurality of rows of data, wherein the neural network data mining model is trained by:
b) selecting a row of data from the training dataset for performing training processing on the neural network data mining model;
c) computing an estimate of a gradient or cost function of the neural network data mining model based on the selected row of data, wherein the cost function accounts for the cost of various nodal transitions;
d) determining whether the gradient or cost function of the neural network data mining model has converged using the selected row of data, based on the computed estimate of the gradient or cost function of the neural network data mining model, wherein the computing an estimate is performed before the determining;
e) repeating steps b)-d) using another row of data, if the gradient or cost function of the neural network data mining model has not converged; and
f) updating weights of the neural network data mining model if the gradient or cost function of the neural network data mining model has converged and providing the number of rows of data that were used for performing training processing on the neural network data mining model, wherein the number of rows that were used is a subset of the total number of rows in the training dataset, wherein the neural network data mining model uses less than the entire training dataset to train the neural network data mining model; and
h) performing additional training processing to the neural network data mining model using the training dataset, wherein the additional training processing is performed using a number of rows of data equal to the provided number of rows of data.

16. The computer program product of claim 15, wherein the selecting step comprises the step of:
randomly selecting the row of data from the training dataset for performing training processing on the neural network data mining model.

17. The computer program product of claim 15, further comprising the step of:
performing additional training processing to the neural network data mining model by repeating steps b)-f) until a decrease in an error of the neural network data mining model is less than a predefined threshold.

18. A computer program product for performing training of a neural network data mining model in a multi-threaded environment in an electronic data processing system, comprising:
a computer readable medium;
computer program instructions, recorded on the computer readable medium, executable by a processor, for performing the steps of:
a) providing a training dataset to a neural network for training an untrained neural network data mining model, the training dataset comprising a plurality of rows of data, wherein the neural network data mining model is trained by:
b) selecting, in each of a plurality of threads, a row of data from the training dataset for performing training processing on the neural network data mining model;
c) computing, in each of the plurality of threads, an estimate of a gradient or cost function of the neural network data mining model based on the selected row of data, wherein the cost function accounts for the cost of various nodal transitions;

d) consolidating the computed estimate of the gradient or cost function of the neural network data mining model from each thread based on the selected row of data to form a consolidated gradient or cost function;

e) determining whether the consolidated gradient or cost function of the neural network data mining model has converged using the selected row of data, based on the consolidated computed estimate of the gradient or cost function of the neural network data mining model, wherein the computing an estimate is performed before the determining;

f) repeating steps b)-e) using another row of data, if the consolidated gradient or cost function of the neural network data mining model has not converged; and g) updating weights of the neural network data mining model if the consolidated gradient or cost function of the neural network data mining model has converged and providing the number of rows of data that were used for performing training processing on the neural network data mining model for each thread in the plurality of threads and consolidating the number of rows for each thread, wherein the consolidated number of rows is a subset of the total number of rows in the training dataset, and wherein the neural network data mining model uses less than the entire training dataset to train the neural network data mining model; and h) performing additional training processing to the neural network data mining model using the training dataset, wherein the additional training processing is performed using a number of rows of data equal to the consolidated number of rows.

19. The computer program product of claim 18, wherein the selecting step comprises the step of:

randomly selecting, in each of the plurality of threads, the row of data from the training dataset for performing training processing on the neural network data mining model.

20. The computer program product of claim 19, wherein each thread processes an equal portion of the number of rows of data processed.

21. The computer program product of claim 20, further comprising the step of:

performing additional training processing to the neural network data mining model by repeating steps b)-f) until a decrease in an error of the neural network data mining model is less than a predefined threshold.

* * * * *